United States Patent

[11] 3,584,509

[72] Inventors William A. Compton;
Albert Marshall Gaylord, both of San Diego, Calif.
[21] Appl. No. 764,234
[22] Filed Oct. 1, 1968
[45] Patented June 15, 1971
[73] Assignee International Harvester Company
San Diego, Calif.

[54] TEMPERATURE MEASURING APPARATUS AND METHODS
14 Claims, 5 Drawing Figs.

[52] U.S. Cl. .................................. 73/346,
73/355 R, 350/61
[51] Int. Cl. ..................................... G01j 5/04,
G02b 5/14
[50] Field of Search ........................... 73/346,
355; 350/61, 63, 96

[56] References Cited
UNITED STATES PATENTS

| | | | |
|---|---|---|---|
| 3,472,497 | 10/1969 | Preszler | 73/351 X |
| 1,792,046 | 2/1931 | Skaupy | 350/319 |
| 2,054,382 | 9/1936 | Larsen et al. | 73/355 X |
| 2,113,450 | 4/1938 | Lasky et al. | 73/355 |
| 2,198,115 | 4/1940 | John | 355/1 |
| 2,438,160 | 3/1948 | Green | 73/355 |
| 2,517,554 | 8/1950 | Frommer | 250/214 |
| 2,556,841 | 6/1951 | Farnell | 73/355 |
| 3,051,035 | 8/1962 | Root | 73/355 X |
| 3,067,610 | 12/1962 | Bockemuehl et al. | 73/355 X |
| 3,145,568 | 8/1964 | Yellot | 73/355 |
| 3,170,329 | 2/1965 | Prediger et al. | 73/355 |

FOREIGN PATENTS

| | | | |
|---|---|---|---|
| 1,092,590 | 11/1967 | Great Britain | 73/355 |

Primary Examiner—Louis R. Prince
Assistant Examiner—Frederick Shoon
Attorney—Strauch, Nolan, Neale, Nies and Kurz ABSTRACT: Temperature measuring apparatus employing a gas collimator and a photovoltaic detector, methods of measuring temperature therewith, and temperature control and indicating systems employing the same.

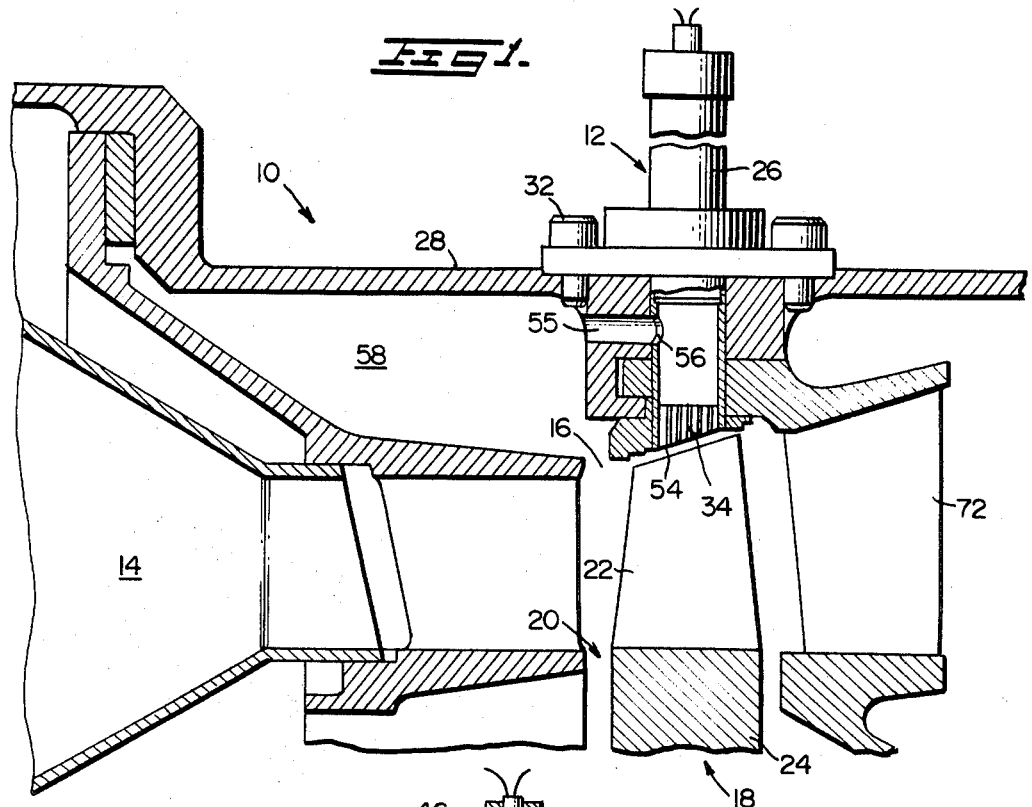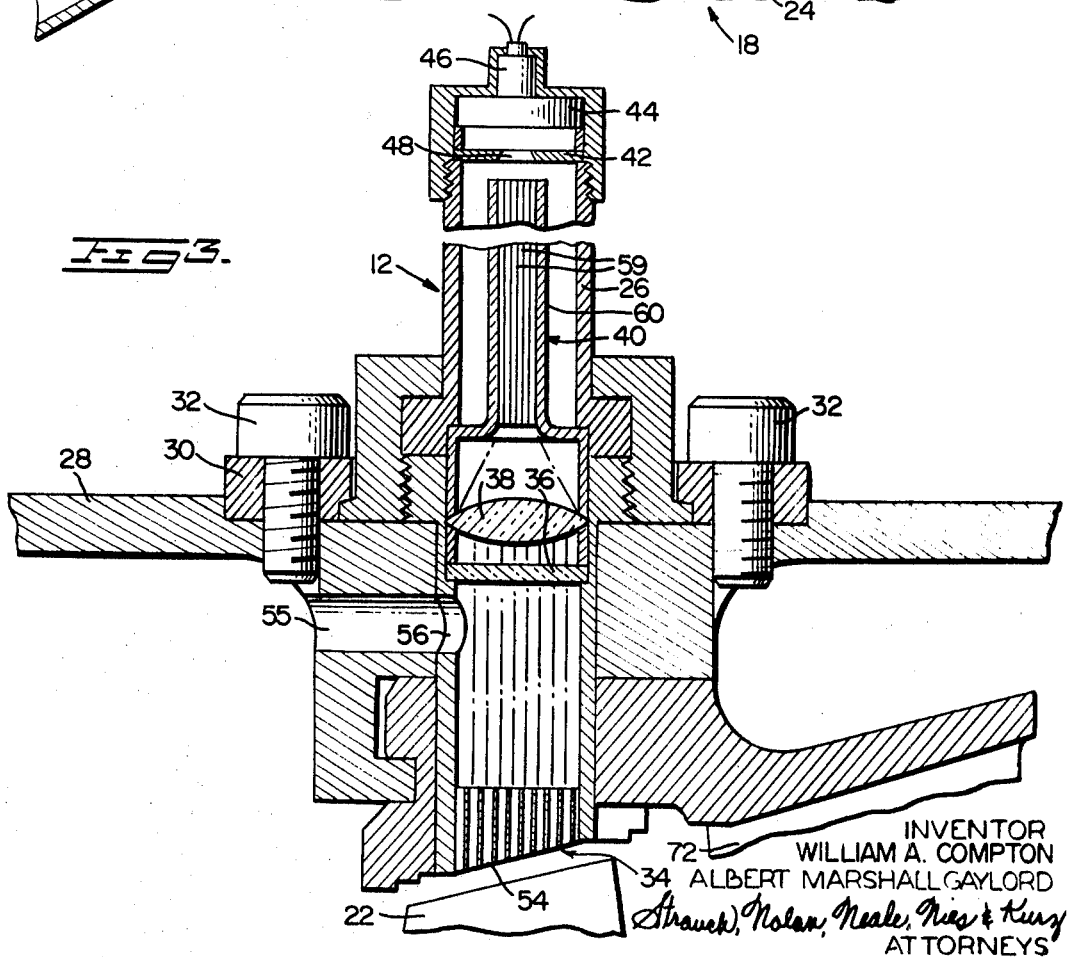

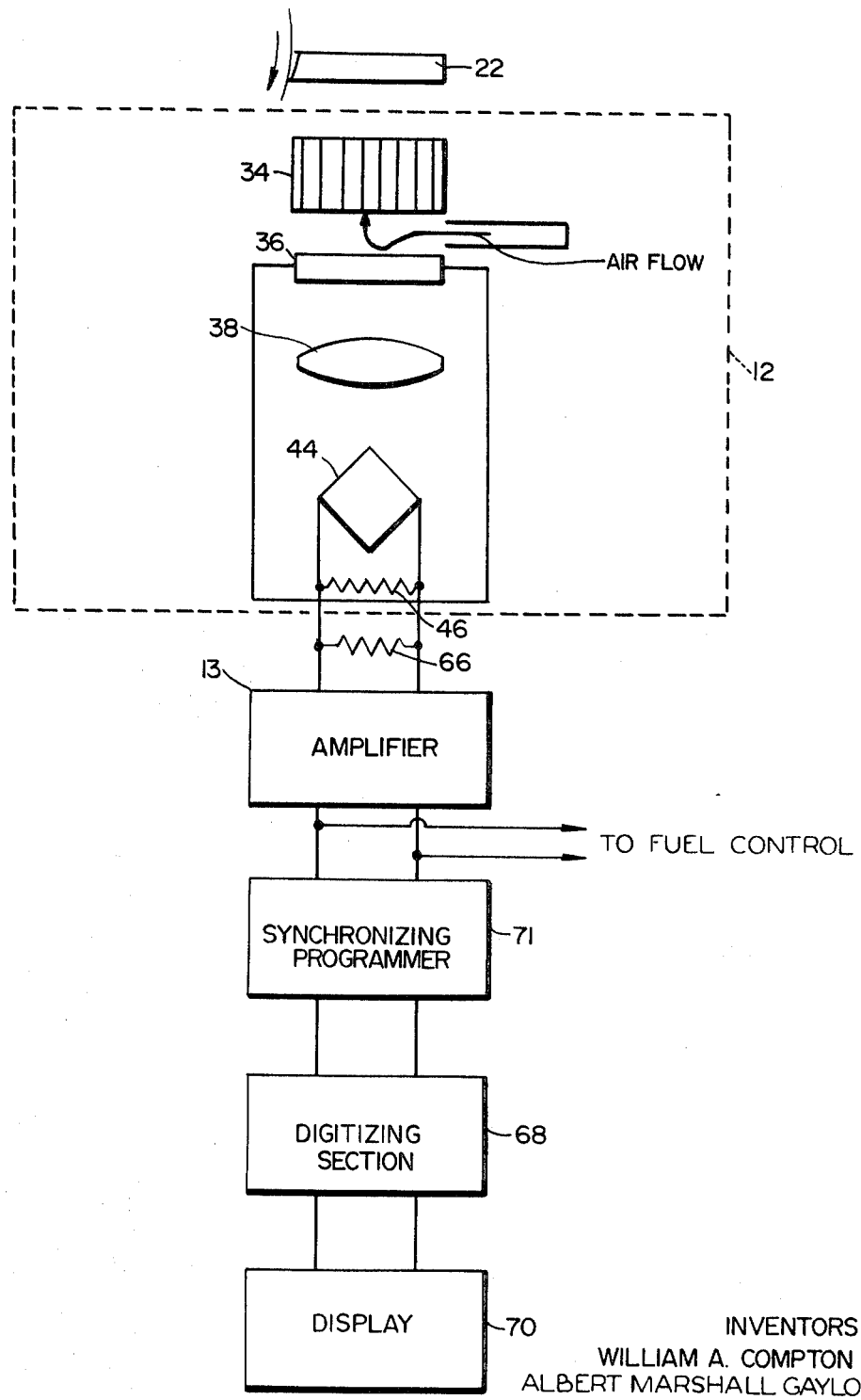

PATENTED JUN 15 1971

INVENTORS
WILLIAM A. COMPTON
ALBERT MARSHALL GAYLORD

Strauch, Nolan, Neale, Nies & Kurz
ATTORNEYS

TEMPERATURE MEASURING APPARATUS AND METHODS

BACKGROUND, SUMMARY, AND OBJECTS OF THE INVENTION

This invention relates to temperature measurement and, more particularly, to novel, improved temperature measuring apparatus and to novel, improved methods of measuring temperature.

The novel apparatus and methods of the present invention are of particular value in the measurement of gas turbine blade or bucket temperatures. The principles of the present invention will accordingly be developed primarily by relating them to this application of the invention. However, it is to be understood that the foregoing is but an exemplary application of the novel apparatus and methods described herein and that the ensuing descriptions and discussions are accordingly not intended to limit the scope of the invention.

The greatest promise for increased performance of gas turbine engines lies in the use of higher turbine inlet temperatures in conjunction with compressors having higher pressure ratios since an increase of only 50° F. in the turbine inlet temperature can produce a major increase in the operating efficiency of a turbine engine. However, precise control of turbine blade or bucket temperatures is critical in such engines because, if a typical turbine bucket is operated at a temperature exceeding its maximum rated temperature by as little as 25° F., the useful life of the bucket may be decreased by as much as 50 percent. Therefore, if advantage is to be taken of the efficiency increase obtainable by operation at optimum temperature, precise control of gas inlet and bucket temperatures is essential.

At the present time bucket temperatures are indirectly controlled by thermocouple measurement of the gas leaving the turbine. This method does not permit optimum bucket temperatures to be utilized since it is relatively inaccurate, and a wide safety margin must accordingly be maintained. This is because thermocouples are insensitive to small temperature changes and because of temperature streaking; i.e., different portions of the gas stream will impinge on the turbine buckets at different temperatures.

The drawbacks of indirect bucket temperature measurement are well known, and proposals have accordingly heretofore been advanced for measuring bucket temperatures directly in turbine engines. So far as we are aware these proposals have all involved the use of optical pyrometers to provide a direct measure of bucket temperature. Among the pyrometers proposed for this application have been those of the photovoltaic type.

These and other heretofore proposed optical pyrometers have a number of disadvantages which make them unsuitable for the intended purpose. First, these pyrometers employ an optical lens to concentrate the radiant energy emitted from the body subjected to temperature measurement. Soot collects on such a lens when it is placed inside a turbine engine, and the soot absorbs an increasing proportion of the radiant energy impinging on the lens as its concentration increases. Accordingly, the accuracy of such pyrometers is rapidly impaired by the collected soot, and they quickly become useless in applications of the type in question.

Second, many currently available optical pyrometers employ a photodetector fabricated from a heat sensitive material. Due to the manner in which these pyrometers are constructed, this detector is located in relatively close proximity to the body subjected to temperature measurement. Such pyrometers are not reliable for measuring turbine bucket temperatures because the extremely high temperatures involved make it impracticable to adequately protect the detector against heat damage.

Third, existing optical pyrometers are sensitive to vibration. Accordingly, they are not suitable for turbine engines, which generate continuous vibrations of considerable magnitude.

Finally, existing pyrometers are unsatisfactory for turbine bucket temperature measurement because of inaccuracies introduced by the combustion products in the turbine. More specifically, the typical combustion products (water vapor, carbon dioxide, and unburned hydrocarbons) have strong absorption bands beginning at wavelengths of about 2.4 microns and extending into the longer wavelengths. Currently available pyrometers employ detectors which are sensitive to radiant energy including that having wavelengths of 2.4 microns and longer. In other words, they are sensitive to radiant energy which is absorbable by the combustion products in the turbine. Since the concentration of combustion products can vary over a wide range, the absorption of energy by the combustion products introduces a significant error of varying magnitude into the reading indicated by such a pyrometer.

It is one important and primary object of the present invention to provide novel, improved apparatus for measuring temperature which does not have the disadvantages of the "prior art" apparatus described above.

A related important and primary object of the invention resides in the provision of novel, improved methods for measuring the temperatures of heated bodies.

The novel temperature measuring apparatus of the present invention by which the foregoing and other objects are attained includes a novel gas collimator transparent to radiant energy emitted from the body subjected to temperature measurement and a photovoltaic detector capable of generating an electrical signal which is proportional to the intensity of the radiant energy falling on it and is therefore indicative of the temperature of the body from which the energy is emitted. This signal is preferably converted by an analog amplifier to one which has a magnitude proportional to the true temperature of the heated body and which can accordingly be utilized directly to control the flow of fuel to a turbine engine and/or converted to a digital signal to provide a temperature reading, for example.

A flow of purge air is maintained through the gas collimator during operation of the novel temperature measuring apparatus we have invented. This prevents foreign material in the environment in which the collimator is located from collecting on it and other optical components of the apparatus. This novel collimator and the apparatus in which it is incorporated accordingly are not subject to the sooting problem appurtenant to heretofore available optical pyrometers.

Another novel feature of the present invention is that the photovoltaic detector is fabricated of a material sensitive only to radiant energy in the range of about 0.5 to about 1.1 microns (this range defines the "optical window" of the detector). Therefore, the presence of or variations in the concentration of combustion products in the environment in which the temperature measuring apparatus is located and the absorption of longer wavelength radiant energy by such combustion products has a negligible effect on the accuracy of the temperature measuring apparatus of the present invention.

Another important advantage of the novel temperature measuring apparatus described above is that its components are simple and extremely rugged, particularly in the case of the electrical components, since they are all of the solid-state type. Accordingly, it is extremely resistant to vibration and other environmental stresses. This makes it eminently suitable for use in gas turbine engines and other applications where resistance to vibration and other environmental stresses is a prerequisite.

Another novel feature which is preferably employed in the present invention (although it does not necessarily have to be for all applications) is the conduction of the radiant energy signal from a point of very high ambient temperature at or near a turbine engine wall from the gas collimator to the photovoltaic detector, which can properly operate only at a much lower ambient temperature, by a fiber optics device or light cable. This permits the photovoltaic detector to be mounted at a considerable distance from the collimator since there is little energy loss in the fiber optics device, and the detector may accordingly easily be protected against heat damage.

Yet another novel and important feature of the present invention is the use of a resistor having a resistance proportional to its temperature in the detector output circuit. This resistor is physically located in the same environment as the detector and accordingly automatically compensates for the effect of ambient temperature changes on the detector.

Apparatus superficially resembling that which we have invented is disclosed in U.S. Pat. No. 3,323,409 issued June 6, 1967, to Frudengel for "SYSTEM FOR MEASURING THE OPTICAL PERMEABILITY OF FLUIDS." However, the Frudengel apparatus is intended for a completely different purpose, and its components for the most part have entirely different functions. This apparatus would accordingly not be satisfactory for the purposes for which our invention was developed.

From the foregoing it will be apparent that further important but more specific objects of the present invention reside in the provision of novel, improved temperature measuring apparatus:

1. which employs a gas collimator and is accordingly free from the inaccuracies introduced by the collection of foreign material on the optical components of currently available temperature measuring apparatus.
2. the accuracy of which is not affected by the presence or variations in the concentration of combustion products in the environment in which it is located.
3. which is rugged and resistant to vibration, heat, and other environmental stresses.
4. which employs a photovoltaic detector and in which provision is made for automatic compensation for changes in the ambient temperature of the environment in which the detector is located.
5. which includes a photovoltaic detector and in which the photovoltaic detector may be disposed at a location remote from the body subjected to temperature measurement to protect the detector from heat damage.

Other important objects of this invention reside in the provision of novel, improved methods for measuring temperature, which are particularly useful in applications where one or more of the following conditions exist:

1. a requirement for precise temperature measurement.
2. the presence of soot or other foreign material capable of adversely affecting the accuracy of temperature measuring devices.
3. the presence of radiant energy absorbing combustion products capable of interfering with the accuracy of temperature measuring devices.
4. vibration and/or heat and/or other environmental stresses.
5. accuracy affecting variations in ambient temperatures.

Other objects and novel features and additional advantages of the invention will become apparent from the appended claims and as the ensuing detailed description and discussion of an exemplary embodiment of the invention proceeds in conjunction with the accompanying drawing.

BRIEF DESCRIPTION OF THE DRAWING

In the drawing:

FIG. 1 is a fragmentary side view, largely in section, of a gas turbine equipped with temperature measuring apparatus embodying and constructed in accord with the principles of the present invention;

FIG. 2 is a diagrammatic illustration of a system for utilizing the temperature indicative electrical signal generated by the apparatus of FIG. 1;

FIG. 3 is a section through the apparatus of FIG. 1;

DETAILED DESCRIPTION OF AN EXEMPLARY EMBODIMENT

Figure 4:
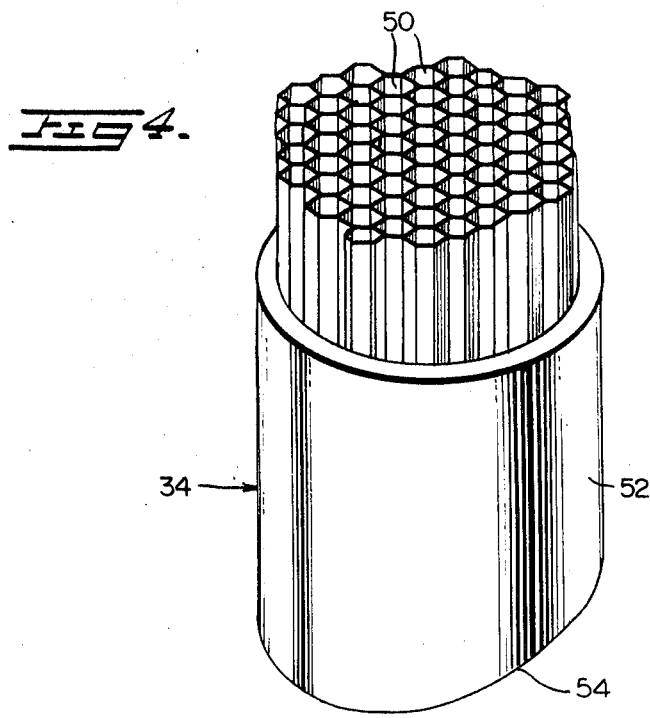
FIG. 4 is a pictorial view in an enlarged scale of a gas collimator incorporated in the temperature measuring apparatus of FIG. 1.

Referring now to the drawing, FIG. 1 illustrates a gas turbine engine 10 equipped with temperature measuring apparatus 12 constructed in accord with and embodying the principles of the present invention. Apparatus 12 produces an electrical signal having a magnitude proportional to the brightness temperature of the monitored engine components; and, in a typical application, this signal is amplified and converted by an analog amplifier 13 (See FIG. 2) to a signal proportional to the true temperature of the monitored components. As shown in FIG. 2, the amplified converted signal can be utilized to regulate the flow of fuel to turbine engine 10 and thereby control the temperature of the monitored components and can also be utilized to provide digital temperature readings.

Turbine engine 10, which is shown in only fragmentary form in FIG. 1, will typically include a compressor section (not shown) from which compressed air flows into a combustion section 14 where fuel is mixed with the compressed air and ignited to heat the air. From the combustion section, the hot compressed air and combustion products flow through inlet 16 into a turbine 18 which includes a wheel 20 consisting of a plurality of turbine blades or buckets 22 fastened to a rotatably mounted shaft 24.

As the hot fluid impinges on the turbine buckets, it rotates the shaft 24 of wheel 20 which is connected to the turbine engine compressor and may also be connected to load equipment such as a generator, propeller, or the like and, in most applications, to auxiliary equipment. Alternatively, the turbine may be employed only to drive the compressor and auxiliary equipment and the hot exhaust gases after passing through turbine 20 directed through an appropriately configured nozzle section to increase their velocity energy and thereby produce thrust capable of propelling an aircraft or other vehicle (an afterburner section is typically positioned ahead of the nozzle section to produce increased thrust).

Gas turbine engines of the type last mentioned (commonly known as turbojet engines) are widely used to propel aircraft. In this application, particularly in supersonic aircraft, it is important that the engines be operated as efficiently as possible, both in commercial aircraft for reasons of economy and in military aircraft to produce maximum performance.

As mentioned above, it is important in obtaining maximum operating efficiencies to maintain the gas inlet temperatures to turbine 18 as high as possible. On the other hand, the maximum established service temperature of the turbine buckets 22 cannot be exceeded as this will result in rapid deterioration of the buckets. It is the function of temperature measuring apparatus 12 to provide an accurate measure of bucket temperature so that these components may be maintained at a temperature which is close to but does not exceed the maximum allowable service temperature.

As best shown in FIG. 3, temperature measuring apparatus 12 includes a casing 26 removably fixed to the housing 28 of gas turbine engine 10 as by collar 30 and capscrews 32. The major components of the temperature measuring apparatus, housed in casing 26, are a gas collimator 34, a quartz or sapphire interface window 36, an objective lens 38, a fiber optics device 40, an apertured disc 42, a photovoltaic detector 44, and a temperature proportional resistor 46. Gas collimator 34 directs a laminar air flow away from the window 36, which provides a seal against the entry of foreign matter. The radiation emitted from the heated target area at the turbine bucket passes through the interface device or collimator 34 and window 36, to lens 38, which concentrates the beam of radiant energy into one end of fiber optics device 40. The latter conducts this energy to an aperture 48 in disc 42, which focuses the energy on photovoltaic detector 44, causing it to generate an electrical signal having a magnitude proportional to the intensity of the radiant energy falling upon it, and accordingly, proportional to the brightness temperature of the turbine buckets.

This signal, the response to which is corrected for variations in ambient temperature by resistor 46, may be employed to regulate the flow of fuel to turbine engine 10 and/or digitized to provide a visual reading of the bucket temperature. As will become apparent hereinafter, the signal generated by detector 44 may be so processed as to provide readings of individual bucket temperatures, an average of the temperature of specified groups of turbine buckets, or an averaged reading of all of the buckets.

Referring now to FIGS. 2 and 4, one of the important and novel features of the present invention is the gas collimator 34. This device includes a plurality of open-ended capillary tubes 50 of a material capable of resisting temperatures typically in the 1,200—2,000° F. range maintained in parallel, juxtaposed relationship by a cylindrical retainer 52. The gas collimator is mounted in casing 26 in any convenient fashion and typically has its end 54 nearest the object or components being monitored (in this case turbine buckets 22) so configured as to be generally parallel to the target portion of the monitored body or components.

Capillary tubes 50 will typically have an inside diameter of from about 0.010 to about 0.100 inches, a length in the range of about 0.125 to 1.00 inches, and a wall thickness such that the total cross-sectional area of the tube walls will not exceed about 10 percent of the total cross-sectional area of the collimator and will accordingly not interfere to a significant extent with the passage of radiant energy through the collimator. The capillary tubes may have a triangular, regular hexagonal, or other polygon cross section or the cross section may be of rectangular, circular, or other regular shape.

As shown in FIGS. 1 and 3, communicating apertures 55 and 56 are formed in gas turbine engine housing 28 and in temperature measuring apparatus casing 26, respectively. These communicating apertures permit clean, uncontaminated, compressed air to bleed from chamber 58 in gas turbine engine 10 into casing 26 and flow through the tubes 50 of gas collimator 34. This air, exiting from the inner ends 54 of tubes 50, cools and prevents overheating of the optical components of apparatus 12 and, even more importantly, prevents soot and other foreign material from collecting on the collimator and absorbing radiant energy emitted from turbine buckets 22. As discussed above, the collection of soot and other foreign material is a problem which has heretofore made the direct measurement of the temperature of turbine buckets and similar objects impractical. Accordingly, the feature just described solves an important, well-known problem.

In conjunction with the foregoing, it is preferable in most applications that the flow of air through collimator 34 be maintained in the laminar region (i.e., at a Reynolds number not greater than about 2,300). Otherwise, carbon particles may become entrained in the turbulent boundary layer adjacent the inner end of the collimator between the purge air stream and the turbine buckets and backstream from the boundary layer to and collect on the collimator and/or other optical components of apparatus 12 with the adverse results discussed above. Also, laminar flow produces the most economical utilization of the purge air and minimum optical interference with the emitted radiant energy.

However, the maintenance of completely laminar flow is not essential to satisfactory operation of the novel temperature measuring apparatus described herein. It may accordingly be used where nonlaminar flow cannot be avoided.

The maintenance of the desired air flow is produced by correlating the length and cross-sectional passage area of tubes 50 with the pressure differential across the gas collimator. Minimum length and maximum diameter are preferred to provide the minimum interference with radiant energy transmission consonant with the maintenance of optimum flow characteristics.

As mentioned above, the provision of the novel collimator 34 just described is one of the important features of the present invention. In the absence of the collimator, the purge air develops its full dynamic head immediately in front of the temperature measuring apparatus casing 26 and forms one or more high speed jets in the turbine passage. The interior of casing 26 in front of lens 38 will in these circumstances contain incoherent eddies, and contaminated turbine passage gases will accordingly backstream through casing 26 and foul lens 38.

By placing the collimator between lens 38 and the gas turbine passage, a positive pressure gradient is developed between the lens and collimator, and the passage between these components is accordingly filled with purge air. Gross eddying motions at the junction of the purge flow with the main turbine flow are thereby avoided and this prevents turbine gases from backstreaming into the casing.

To demonstrate the importance of the gas collimator, apparatus comparable to that illustrated in FIG. 1 was operated with the purging air flow but without the collimator, the air flowing instead through the passage defined by the housing of the apparatus. Soot rapidly collected on the interface window, rendering the temperature measuring apparatus inoperative. In contrast the novel gas collimator of the present invention will remain free of deposits indefinitely.

Gas collimator 34 allows the radiant energy emitted from turbine buckets 22 to pass through interface window or seal 36 to lens 38, which will typically be formed of quartz or other heat resistant optical material. Lens 38 focuses the radiant energy on one end of fiber optics device 40 as mentioned above. The latter may be of any desired construction, a number of which are commercially available, and will typically consist of a bundle of coated glass fibers 59 cemented together and surrounded by a protective casing 60.

The use of the fiber optics device, while not mandatory in all applications, will typically prove to be beneficial since it can be employed to conduct the radiant energy without significant loss to a location 6 or 12 inches or more away from collimator 34. This permits detector 44, which is typically formed of a material having comparatively low heat resistance, to be located far enough from the collimator and the heated components being monitored to prevent overheating and thereby prolong the life of the pyrometer as well as simplify its maintenance.

The radiant energy exiting from the fiber optics device 40 is focused by aperture 48 on the photovoltaic detector 44. Another of the important features of the present invention is the particular type of detector which is employed. More specifically, it is preferred that a silicon-type photovoltaic detector be employed in the present invention.

One reason for employing this particular type of detector is that it is a solid-state device and can withstand the very high vibrations produced by a gas turbine engine. Also, as discussed above, the combustion products present in a gas turbine engine have strong absorption bands at wavelengths of 2.4 microns and longer and accordingly absorb varying proportions of the emitted energy in these bands as the concentration of combustion products between collimator 34 and turbine buckets 22 changes, thereby causing the detector to generate an inaccurate signal. A silicon-type photovoltaic detector as preferably employed in the present invention generates an electrical signal having a magnitude proportional to the intensity of incident radiant energy in the wavelengths of from about 0.5 to about 1.1 microns, however, so its accuracy is not affected by the presence or changes in the concentration of combustion products between the collimator and turbine buckets.

Another important advantage of the preferred type of photovoltaic detector is that the intensity of the energy in the band to which it is sensitive increases much more rapidly than temperature in the range in which temperature measuring apparatus of the type disclosed herein is intended to be employed (typically 1,200—2,000° F.). For example, the gas inlet temperature in a turbine of the type illustrated in FIG. 1 will typically be in the range of 1,800° to 3,000° F. and the buckets will be at a temperature on the order of 1,7500° F. At this temperature the intensity of radiation in the 0.5—1.1 micron range increases as a function of the thirteenth power of the absolute temperature for the preferred type of detector. Since the magnitude of the current generated by the detector is proportional to the intensity of the incident radiant energy in this band, only slight changes in the temperature of the monitored object produce large changes in the magnitude of the output signal, and the detector is accordingly extremely sensitive and capable of very accurate temperature measurements.

Furthermore, since the intensity of the incident radiation is proportional to the coefficient of emissivity to only the first power, changes of the coefficient of emissivity of the monitored body or component have only a negligible effect on the accuracy of the signal generated by the preferred type of photovoltaic detector. This is of obvious importance in applications such as that discussed herein.

A further advantage of the preferred type of detector is that its response time is extremely rapid since this is limited only by the time constant function of the impedance in the load device into which the signal is fed. Typically, this time constant can be reduced to a maximum of 5 microseconds. This is sufficiently rapid to permit direct measurement of individual turbine bucket temperatures, if desired, an attribute of obvious importance.

As indicated above, bucket temperatures will typically be in the neighborhood of 1,700° F. in engines of the type in question, and engine housing 28 may reach temperatures as high as 1,000° F. in operation and/or immediately after shutdown. Photovoltaic detectors of the preferred type, in contrast, undergo degradation at temperatures exceeding 250°—300° F. This, however, has been overcome in temperature measuring apparatus of the type disclosed herein since fiber optics device 40 permits the detector to be located away from the interior of the turbine engine and its housing in a region where ambient temperatures do not exceed the level just mentioned. Accordingly, for applications of the type just described, the utilization of such a fiber optics device provides significant benefits.

Figure 5:
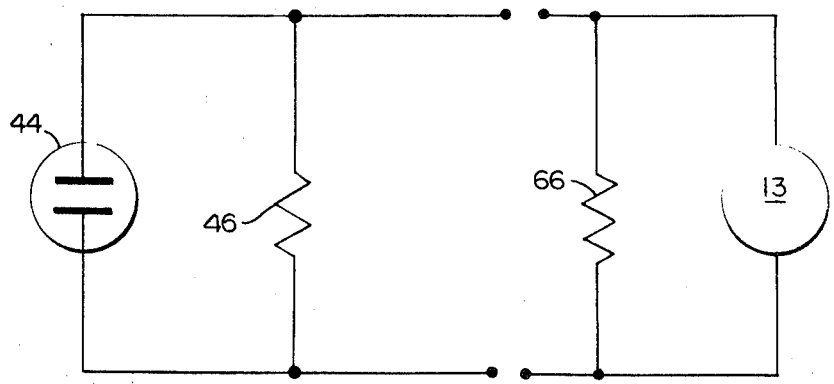
FIG. 5 is a schematic diagram of a photovoltaic detector output circuit employed in the apparatus of FIG. 1.

Referring now to FIG. 5, the photovoltaic detector 44 of temperature measuring apparatus 12 is electrically connected to a load device which, as discussed above, will typically be analog amplifier 13. Calibration resistor 66 will normally be connected in parallel between the detector and load device to reduce the voltage drop across the load device and thereby facilitate handling of the detector generated signal.

Also, the temperature proportional resistance 46 (typically a thermistor) discussed above is preferably connected in parallel with the detector and load device. This is because the current produced by a silicon-type photovoltaic detector is linearly proportional to the ambient temperature of the environment in which the detector is located. Accordingly, compensation must be provided for changes in the magnitude of the output current attributable to changes in the ambient temperature rather than the intensity of the radiant energy emitted from the object being monitored and falling on the detector. Thermistor 46 provides a temperature correlated resistance in the detector output circuit and, accordingly, furnishes the necessary compensation.

Referring again to FIG. 2, and as mentioned briefly above, the signal generated by detector 44 will typically be amplified and converted to one having a magnitude proportional to the true temperature of the body being monitored. The amplified signal can be employed to modulate the flow of fuel to turbine engine combustion section 14 and thereby maintain the turbine bucket temperature at the desired level to produce maximum efficiency and/or constant power output and other desirable operating characteristics.

Also, the signal can be fed through a digitizing section 68 consisting of analog-to-digital and binary-to-decimal converters of conventional construction and then into a conventional register 70 to provide a digital display of the temperature of the body being monitored. Also, by connecting a conventional synchronizing programmer 71 between the amplifier and digitizing sections, the amplified signal can be picked off at intervals so selected that the temperature which is displayed on register 70 will be that of a specific bucket 22, the average temperature of a selected group of buckets, or the average of all the buckets in wheel 20.

Numerous modifications may of course be made in the exemplary embodiment of the invention just described without exceeding its scope. For example, other types of photovoltaic detectors may be substituted for the preferred silicon type. One example of an alternate photovoltaic material is selenium, which has a spectral sensitivity of approximately 0.3 to approximately 0.8 microns. However, for most applications, selenium is less desirable than silicon since it is less stable with respect to its ambient environment.

As another example of typical modifications which may be made in the exemplary embodiment of the invention described above, it may be desirable to cool the photovoltaic detector so that it may be located more closely adjacent the gas collimator or so the fiber optics device may be eliminated. This is readily accomplished by circulating turbine engine fuel in heat transfer relationship to the detector.

Also, modifications may be made in the exemplary optical system discussed above without exceeding the scope of the present invention. For example, in many applications, interface window 36 may be eliminated and objective lens 38 modified so that it will serve both as a focusing device and as an interface window. Further, apertured disc 42 may be eliminated and the adjacent end of fiber optics device 40 made integral with photovoltaic detector 44 to minimize end losses. Further, varying numbers of the optical components of the system can be integrated with gas collimator 34, if desired.

As a further example of the modifications which may be made in the illustrated embodiment of the invention, temperature measuring apparatus 12 in the illustrated embodiment is installed so that its optical path is in the plane of turbine bucket rotation and included at an angle of approximately 35° to a radial line through the axis of rotation. Thus installed, the concave side of the bucket near its leading edge (or trailing edge depending upon the longitudinal positioning of the apparatus) is the target area.

An alternate arrangement which may be used locates the optical path of the temperature measuring apparatus between the first stage nozzle vanes 72 and inclined at an angle of approximately 45° to the rotational axis of the engine. This places the target approximately one-third of the distance between the roots and tips of the buckets.

Modifications may also be made in the other sections of the system shown in FIG. 2. For example, a conventional compensating circuit may be added to the amplifier section to compensate for variations in the output characteristics of different temperature sensing units and to decrease the performance requirements of the logarithmic amplifier. Also, if individual bucket temperatures are not required or a digital signal is unnecessary, part or all of the synchronizing, digitizing, and display sections may be eliminated.

In short, numerous modifications may be made in the exemplary embodiment of the invention described above without exceeding its scope. To the extent that these modifications are not expressly disclaimed in the appended claims, they are fully intended to be covered therein.

Furthermore, it will be apparent from the foregoing that the novel temperature measuring apparatus described herein may be employed in applications other than that discussed above. Such additional applications of the principles of the invention are also fully intended to be covered in the appended claims to the extent that they are not expressly excluded therefrom.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to be secured by Letters Patent is:

1. A turbine engine comprising a housing, a component in said housing, and means for measuring the temperature of said component comprising casing means extending from exteriorly of said housing through said housing to a location adjacent the component in said housing, a photovoltaic detector in said casing means exteriorly of the turbine engine housing for generating an electrical signal proportional in magnitude to the intensity of radiant energy incident thereon, a radiant energy transmitting window in said casing means intermediate the ends thereof, means for effecting a flow of fluid through said casing to keep particles of foreign matter away from said window, said last-mentioned means including a plurality of open-ended capillary tubes of heat resistant material through which radiant energy can pass mounted in said casing, means for maintaining said tubes in a juxtaposed, parallel, assembled relationship and means providing an inlet to said casing so located that air can enter and flow through said casing into the ends of the tubes furtherest from the component in the turbine engine housing.

2. Temperature measuring apparatus comprising a device for concentrating radiant energy emitted from a heated body and impinging thereon, a photovoltaic detector so located as to intercept the radiant energy and thereby generate a current indicative of the temperature of the heated body, and means for effecting a flow of fluid through said device to minimize the collection of radiant energy absorbing foreign matter thereon, said last-mentioned means comprising a plurality of open-ended capillary tubes of heat resistant material and means for maintaining said tubes in a juxtaposed, parallel, assembled relationship and wherein there is an inlet to said apparatus so located that air can enter therethrough and flow through the apparatus into said tubes.

3. Temperature measuring apparatus comprising casing means, a photovoltaic detector in said casing means for generating an electrical signal proportional in magnitude to the intensity of radiant energy incident thereon, a radiant energy transmitting window in said casing means intermediate the ends thereof, means for effecting a flow of fluid through said casing means on the side of said window opposite the photovoltaic detector to keep foreign particles away from said window, and a fiber optics device mounted in said casing means between said window and said detector for conducting to said detector the radiant energy passing through said window.

4. The temperature measuring apparatus of claim 3, wherein said temperature measuring apparatus further includes a lens between said window and said fiber optics device for focusing on said fiber optics device the radiant energy passing through said window, and an apertured member between said fiber optics device and said photovoltaic detector for concentrating on said detector the radiant energy conducted thereto by said fiber optics device.

5. In a method of measuring the temperature of a heated body comprising the steps of transmitting radiant energy emitted by said body through a window and directing said radiant energy onto a photovoltaic detector capable of generating an electrical signal having a magnitude proportional to the intensity of the radiant energy incident thereon and thereby indicative of the temperature of the heated body, the improvements wherein a fluid is circulated across the face of the window nearest the heated body to prevent radiant energy absorbing foreign material from collecting thereon, the flow of air being maintained in the laminar region to avoid the creation of currents adjacent said device in which said foreign material can collect, and wherein said photovoltaic detector is disposed at a location removed from said heated body to prevent overheating, and including the step of conducting the radiant energy to said photovoltaic detector through a fiber optics device to minimize dispersion of said energy.

6. The method of claim 5, together with the step of so varying the signal generated by said photovoltaic detector as to compensate for changes in the ambient temperature of the environment in which said detector is located.

7. The method of claim 5, wherein the magnitude of the generated signal is proportioned to the intensity of that portion of the emitted energy having wavelengths not exceeding about 1.1 microns to thereby avoid temperature measurement errors attributable to the absorption of emitted energy by combustion products present in the environment in which the heated body is located.

8. A turbine engine comprising a housing, a component in said housing, means for measuring the temperature of said component comprising casing means extending from exteriorly of said housing through said housing to a location adjacent the component in said housing, and means fixing said casing means to said turbine engine housing, said temperature measuring means further comprising a photovoltaic detector in said casing means exteriorly of the turbine engine housing for generating an electrical signal proportional in magnitude to the intensity of radiant energy incident thereon, a radiant energy transmitting window in said casing means intermediate the ends thereof, a first opening through said casing means on the opposite side of said window from said photovoltaic detector, means for effecting a flow of fluid through said opening, and means having fluid flow passages therethrough disposed in the end of said casing means opposite said detector, there being a second opening through said casing in the end thereof in which said last-mentioned means is disposed, whereby fluid can flow into said casing means, across said window, and exit through said last-mentioned means to thereby keep particles of foreign matter away from said window, said last-mentioned means further being capable of passing radiant energy, whereby such energy can pass from the component in the turbine engine housing through said means and said window to said photovoltaic detector.

9. Apparatus for measuring the temperature of a turbine engine component comprising casing means, a photovoltaic detector in said casing means for generating an electrical signal proportional in magnitude to the intensity of radiant energy incident thereon, a radiant energy transmitting window in said casing means intermediate the ends thereof, a first opening through said casing means, said opening being located on the opposite side of said window from said photovoltaic detector, and means having fluid flow passages therethrough disposed in the end of said casing means opposite said detector, there being a second opening through said casing in the end thereof in which said last-mentioned means is disposed, whereby fluid can flow into said casing means, across said window, and exit through said last-mentioned means to thereby keep particles of foreign matter away from said window, said last-mentioned means further being capable of passing radiant energy, whereby such energy can pass through said means and said window to said photovoltaic detector.

10. The temperature measuring apparatus of claim 9, wherein said electrical signal is exponential and including a logarithmic amplifier electrically connected to said detector for converting said electrical signal to one which is proportional to the actual temperature of the turbine engine component.

11. The temperature measuring apparatus of claim 9, wherein said photovoltaic detector is fabricated of a silicon material responsive to radiant energy having wavelengths not longer than about 1.1 microns, whereby the emitted energy to which the detector responds is not absorbed by combustion products and the magnitude of the electrical signal generated by said detector is accordingly not affected by the presence or variations in the concentration of combustion products in the environment in which the turbine engine component is located.

12. The temperature measuring apparatus of claim 9, further including a thermistor closely adjacent and electrically connected to said photovoltaic detector to compensate for variations in the magnitude of the generated signal resulting from changes in the temperature of the environment in which the photovoltaic detector is located.

13. Temperature measuring apparatus for use in environments in which combustion products may be present comprising a casing means, a photovoltaic detector in said casing means for generating an electrical signal proportional in magnitude to the intensity of radiant energy incident thereon, a radiant energy transmitting window in said casing means intermediate the ends thereof, a first opening through said casing means, said opening being located on the opposite side of said window from said photovoltaic detector, and means having fluid flow passages therethrough disposed in the end of said casing means opposite said detector, there being a second opening through said casing in the end thereof in which said last-mentioned means is disposed, whereby fluid can flow into said casing means, across said window, and exit through said last-mentioned means to thereby keep particles of foreign matter away from said window, said last-mentioned means further being capable of passing radiant energy, whereby such energy can pass through said means and said window to said photovoltaic detector, and said detector being fabricated of a material responsive to energy having wavelengths not longer than about 1.1 microns, whereby the emitted energy to which the detector responds is not absorbed by combustion products in the environment in which said energy is generated and the temperature indicative signal generated by the detector is accordingly not affected by the presence or variations of the concentration of combustion products in said environment.

14. The temperature measuring apparatus of claim 13, wherein said photovoltaic detector is fabricated of a material responsive to radiant energy having wavelengths in the range from about 0.5 to about 1.1 microns.